United States Patent
Peterreins et al.

(10) Patent No.: US 9,391,484 B2
(45) Date of Patent: Jul. 12, 2016

(54) ACTUATOR UNIT WITH CONDUCTOR STAMPING

(71) Applicant: Bühler Motor GmbH, Nürnberg (DE)

(72) Inventors: Thomas Peterreins, Nuremburg (DE); Wjatscheslav Sachnov, Altdorf (DE)

(73) Assignee: Bühler Motor GmbH, Nürnberg (DE)

( * ) Notice: Subject to any disclaimer, the term of this patent is extended or adjusted under 35 U.S.C. 154(b) by 285 days.

(21) Appl. No.: 14/172,411

(22) Filed: Feb. 4, 2014

(65) Prior Publication Data

US 2014/0152132 A1 Jun. 5, 2014

Related U.S. Application Data

(63) Continuation of application No. PCT/DE2012/200068, filed on Oct. 12, 2012.

(30) Foreign Application Priority Data

Oct. 12, 2011 (DE) .......................... 10 2011 084 341

(51) Int. Cl.
| | |
|---|---|
| *H02K 5/22* | (2006.01) |
| *H02K 5/08* | (2006.01) |
| *H02K 7/116* | (2006.01) |

(52) U.S. Cl.
CPC .. *H02K 5/22* (2013.01); *H02K 5/08* (2013.01); *H02K 5/225* (2013.01); *H02K 7/116* (2013.01); *H02K 11/33* (2016.01)

(58) Field of Classification Search
CPC ........... H02K 5/22; H02K 5/225; H02K 5/08; H02K 11/0073
USPC .......................................................... 310/71
See application file for complete search history.

(56) References Cited

U.S. PATENT DOCUMENTS

| | | | | |
|---|---|---|---|---|
| 5,354,214 | A * | 10/1994 | Aso ........................ | H01R 12/79 439/492 |
| 6,390,062 | B1 * | 5/2002 | Saito ...................... | F02D 9/1065 123/361 |
| 8,627,745 | B2 * | 1/2014 | Uchimura .............. | F16H 57/023 74/425 |
| 2007/0079980 | A1 * | 4/2007 | Kononenko ............... | B25F 5/00 173/90 |
| 2007/0103010 | A1 * | 5/2007 | Kouzu ..................... | H02K 5/24 310/51 |
| 2011/0166512 | A1 | 7/2011 | Both et al. | |

* cited by examiner

*Primary Examiner* — Terrance Kenerly
(74) *Attorney, Agent, or Firm* — Westerman, Hattori, Daniels & Adrian, LLP

(57) ABSTRACT

An actuating drive having a housing which comprises receptacles for a step-down gear mechanism and for a very small electric motor, wherein the motor receptacle is connected to a terminal cover. The very small electric motor is held securely without play. The terminal cover comprises a conductor stamping which is encapsulated with plastic material and has motor contact areas which interengage with connection lugs of the very small electric motor, and in that the baffle plate has retaining regions which interengage with housing elements on the housing.

8 Claims, 5 Drawing Sheets

ACTUATOR UNIT WITH CONDUCTOR STAMPING

CROSS-REFERENCE TO RELATED APPLICATIONS

The present patent application is a continuation of International Application No. PCT/DE2012/200068, filed Oct. 12, 2012, which is based on, and claims priority from, German Application No. DE 10 2011 084 341.8, filed Oct. 12, 2011, both of which are incorporated herein by reference in their entireties.

BACKGROUND OF THE INVENTION (1) Field of the Invention

This invention relates to an actuator unit with a housing that includes receptacles for a step-down gear unit and for a miniature electric motor, wherein the seating for the motor is connected to a terminal cover.

(2) Description of Related Art Including Information Disclosed Under 37 CFR 1.97 and 1.98

An actuator unit of the type in question that serves as a drive for a piston of a drug-administering device with which slow, finely dosed drug dispensing is achieved, is known from U.S. 2011/0166512 A1. The seating for the miniature electric motor is designed here as a snap-fit connection that connects the terminal cover and the housing. This snap-fit connection requires very fine tolerances to limit the gap between the electric motor and the housing. Since the step-down gear unit is provided with a very fine gearing due to its small size and high reduction ratio, and since the miniature electric motor is a mass-produced item with a relatively large outer dimensional tolerance, the gearing of the step-down gear unit between a motor pinion and a gear wheel may disengage if the combination of parts is unfavorable, rendering the device unusable.

It is therefore the object of the present invention to provide a secure gap-free seating of the miniature electric motor of an actuator unit of the type in question as well as simple assembly and manufacture of the components used and high cost-effectiveness.

BRIEF SUMMARY OF THE INVENTION

This object is achieved, according to the invention, by using motor contact areas of the terminal cover for safe and simple contacting of connection lugs of the electric motor that extend paraxially from its front. The holding sections of the conductor stamping are used to interlock with molded-on housing elements. The position of the terminal cover relative to the housing only depends on the length of the motor. The miniature electric motor is always seated gap-free in the housing, even at different motor lengths, because the terminal cover is positively fitted during assembly. This process can easily be automated. In this way, mass-produced motors can be used that provide for high cost-effectiveness.

The assembly direction of the conductor stamping relative to the lugs is parallel to the assembly direction of the conductor stamping relative to the molded-on housing elements. Electrical connection of the miniature electric motor and the mechanical joint of the terminal cover with the housing of the actuator unit and thus the mechanical fastening of the electric motor can be produced in one operation and with one joining movement.

Shaving ribs that keep the miniature electric motor gap-free but can be ground off or deformed if the motor is oversize are provided in the seat of the housing to achieve radial fastening of the electric motor in the housing.

In a preferred embodiment of the invention, narrow tongues molded onto the housing downstream of the seat for the miniature electric motor, which in installed state protrude beyond the terminal cover at the upper tolerance limit for the length of the electric motor. In this way, the terminal cover can hold a miniature electric motor axially gap-free and securely in its seat across a wide tolerance range.

It is advantageous that the contacts of the terminal cover are designed as resilient contact wipers, which ensures simple assembly and some tolerance compensation.

Guards positioned on both sides of the contact wipers are provided on the plastic material molded around the conductor stamping to prevent bending of these contacts in the manufacturing process. The contact wipers extend substantially radially from the terminal cover; the same applies to the guards that are provided like plates on both sides of the contact wipers at the ends of the terminal cover and an additional guard arranged parallel to the outer guards between the contact wipers.

A particularly preferred embodiment of the invention is characterized by protrusions that are used as spacers for the molded-on housing elements near the holding sections. The molded-on housing elements are somewhat inclined inwards and are therefore not in an optimum position in relation to the holding sections. The holding sections are sheet metal plates that are part of the overmolded conductor stamping; they consist of two opposing sheet metal plates, slightly angled to facilitate joining with the molded-on housing elements and at the same time preventing detachment from the same. The sheet metal plates are concave where they are in contact with the molded-on housing elements such that they are matched with the slightly convex molded-on housing elements. This configuration results in an optimum radial position of the molded-on housing elements, which is reached using the spacers.

It is useful that the terminal cover comprises a wall that radially embraces the end of the electric motor at least three points. This wall is to prevent the terminal cover from just being held radially by the motor contact areas, which, apart from the concave shape, have a similar design and are pre-bent in the same direction as the holding sections. The wall is used for radially centering the miniature electric motor in relation to the terminal cover. The terminal cover itself is centered in relation to the motor seat through the molded-on housing elements.

BRIEF DESCRIPTION OF THE SEVERAL VIEWS OF THE DRAWINGS

An embodiment of the invention is explained in greater detail below with reference to the drawing. Wherein.

DETAILED DESCRIPTION OF THE INVENTION

Figure 1:
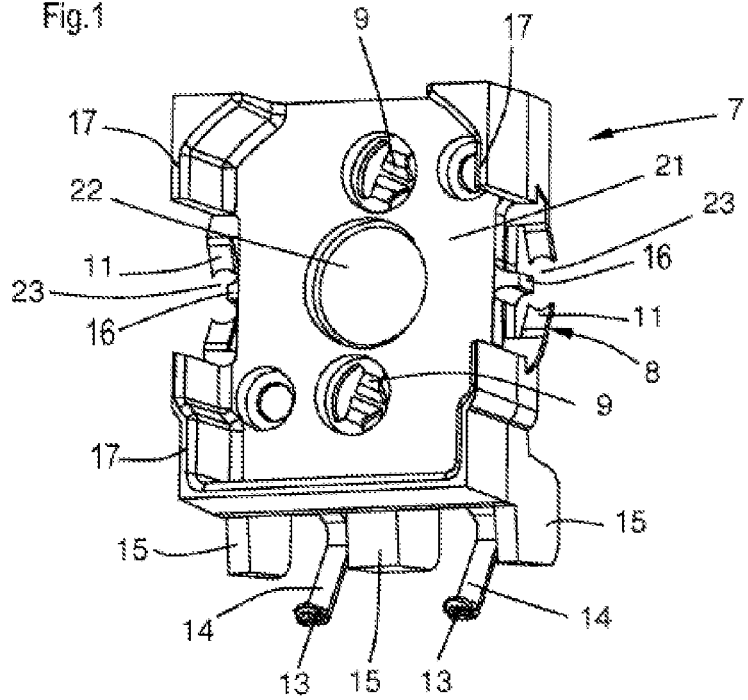
FIG. 1 shows a terminal cover.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 5:
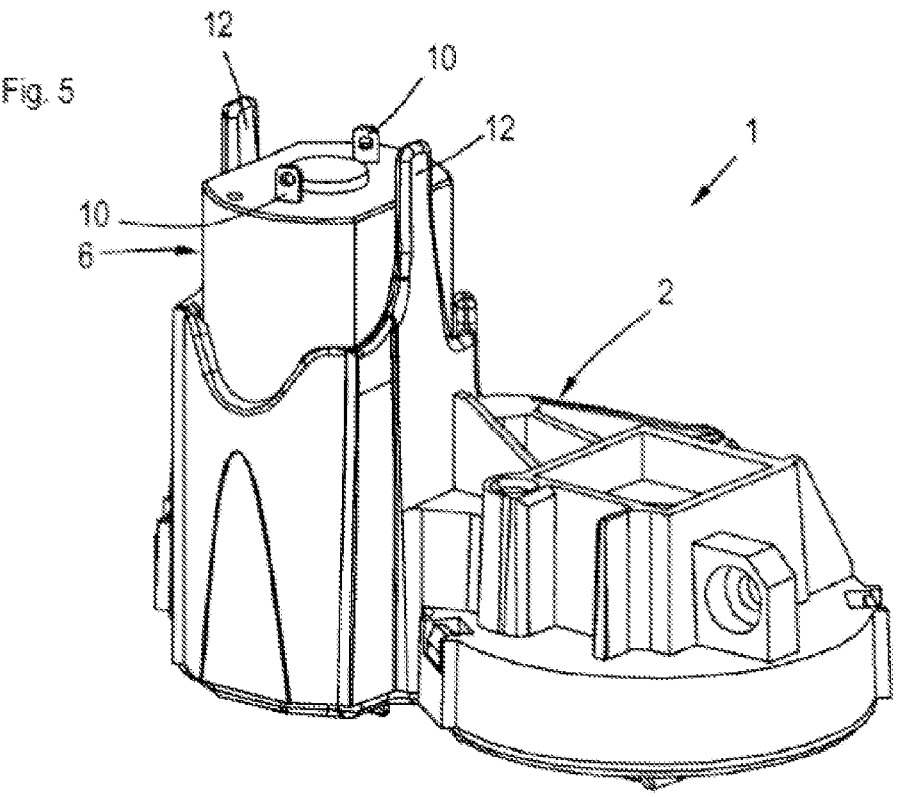
FIG. 5 shows the housing with a built-in miniature electric motor.

FIG. 1 shows a terminal cover 7 in the form of a conductor stamping 8 extrusion-coated overmolded with a plastic material. The terminal cover 7 is used as a connecting element for a miniature electric motor having axially oriented lugs 10 that can be contacted by motor contact areas 9 of the terminal cover 7. The motor contact areas 9 are located in an area 21 of the terminal cover 7 that comprises an offset 22 between the motor contact area 9 which serves as a seating for the electric motor 6 (FIG. 5). The area 21 is partially encompassed by a wall 17 comprising multiple interruptions. The wall 17 is designed for centering the electric motor 6. In the example shown, the wall 17 consists of three sections such that the electric motor 6 is held in all radial directions. The height of the walls 17 is limited to prevent spatial overlap with the housing of an actuator unit. The conductor stamping 8 comprises holding sections 11 on the rim of the terminal cover 7 that consist of two opposing sheet metal plates which leave a gap 23 provided for accommodating molded-on housing elements. The gaps 23 on both sides of the terminal cover 7 are limited at a right angle with the plates by spacers 16; these are used to guide and center the terminal cover to the housing of the actuator unit. There is no extra limitation of the gaps 23 in the outward direction. It would be conceivable to provide an additional guiding web here. The conductor stamping 8 further comprises contact wipers 14 at the ends of which contacts 13 are located that are used as connectors for a contact area of a circuit board. Plate-like guards 15 are molded onto both sides of the contact wipers 14 using the same plastic material as the terminal cover 7 to protect the contact wipers from deformation, especially during the manufacturing process. Two guards 15 are provided in the outer areas of the terminal cover 7, and one guard 15 is provided between the contact wipers.

Figure 2:
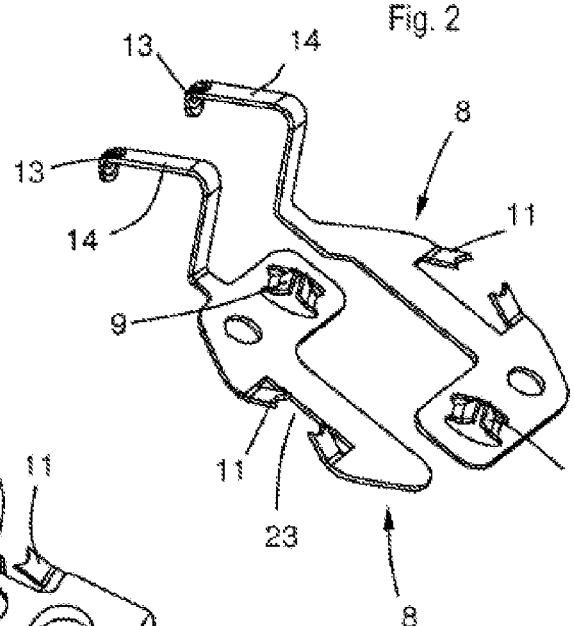
FIG. 2 shows a two-piece conductor stamping as part of the terminal cover.

FIG. 2 shows the conductor stamping 8, which, when installed, consists of two electrically isolated plate sections. These two plate sections are connected by sheet metal bridges before extrusion coating. The bridges are then punched out or cut off. It is apparent that the motor contact areas 9 and the holding areas 11 are located in the same plate plane. The contact wipers 14 with their contacts 13 extend from the plate level and consist of multiple bends.

Figure 3:
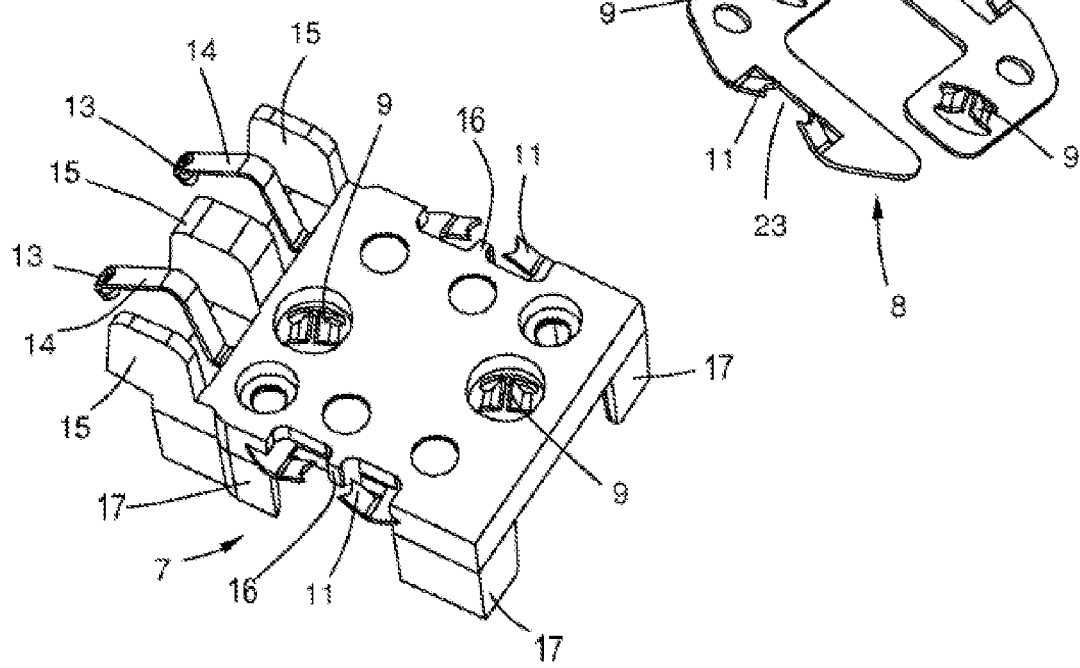
FIG. 3 shows a second view of the terminal cover.

FIG. 3 shows the terminal cover 7 from a different perspective. Cylindrical tool stamps were left out during extrusion coating overmolding to make the motor contact areas 9 useful. The figure further shows: the contact wipers 14 with contacts 13, the guard 15, the wall 17, the holding areas 11, and the spacer 16.

Figure 4:
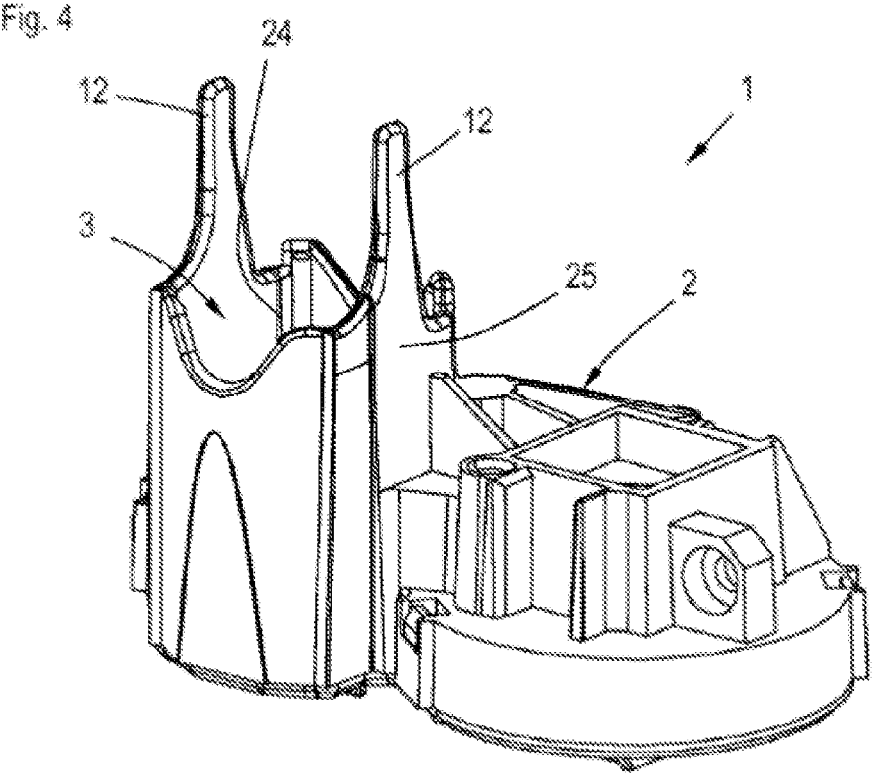
FIG. 4 shows a housing of an actuator unit.

FIG. 4 shows the housing 2 of the actuator unit 1 having a motor seat 3 that matches the shape of a flat miniature electric motor. The motor seat comprises shaving ribs 24 that ensure gap-free seating of the miniature electric motor a housing wall 25 of the motor seat 3 is followed by two molded-on housing elements 12 and provided for mechanical accommodation of the terminal cover. A housing section that forms the seat for the gear unit follows in radial direction after the motor seat 3.

FIG. 5 shows the miniature electric motor 6, inserted in the motor seat 3 of the housing 2, without terminal cover. The miniature electric motor comprises two lugs 10 that protrude in axial direction. The molded-on housing elements 12 and the lugs 10 are parallel to one another. There is no set assembly sequence. The motor can first be pressed into the motor seat, then the terminal cover 7 can be mounted, or an assembly of the miniature electric motor and the terminal cover can be produced first and then installed in the housing.

Figure 6:
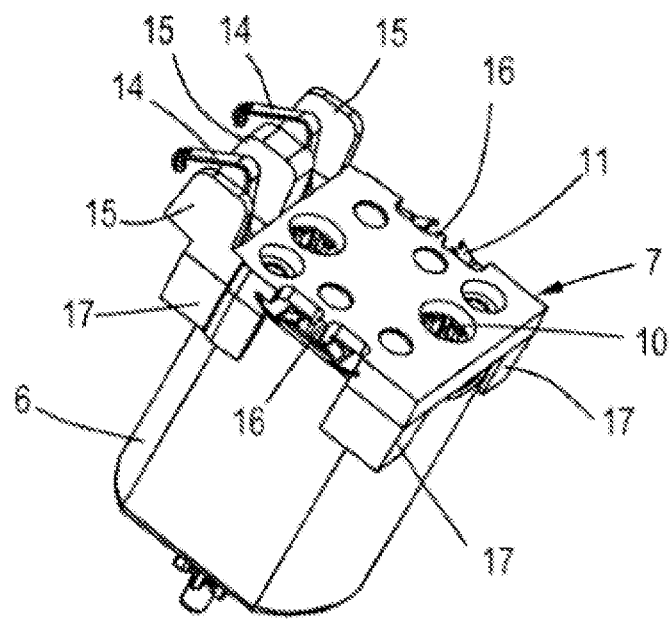
FIG. 6 shows the miniature electric motor with a pre-assembled terminal lid as one module.
Figure 8:
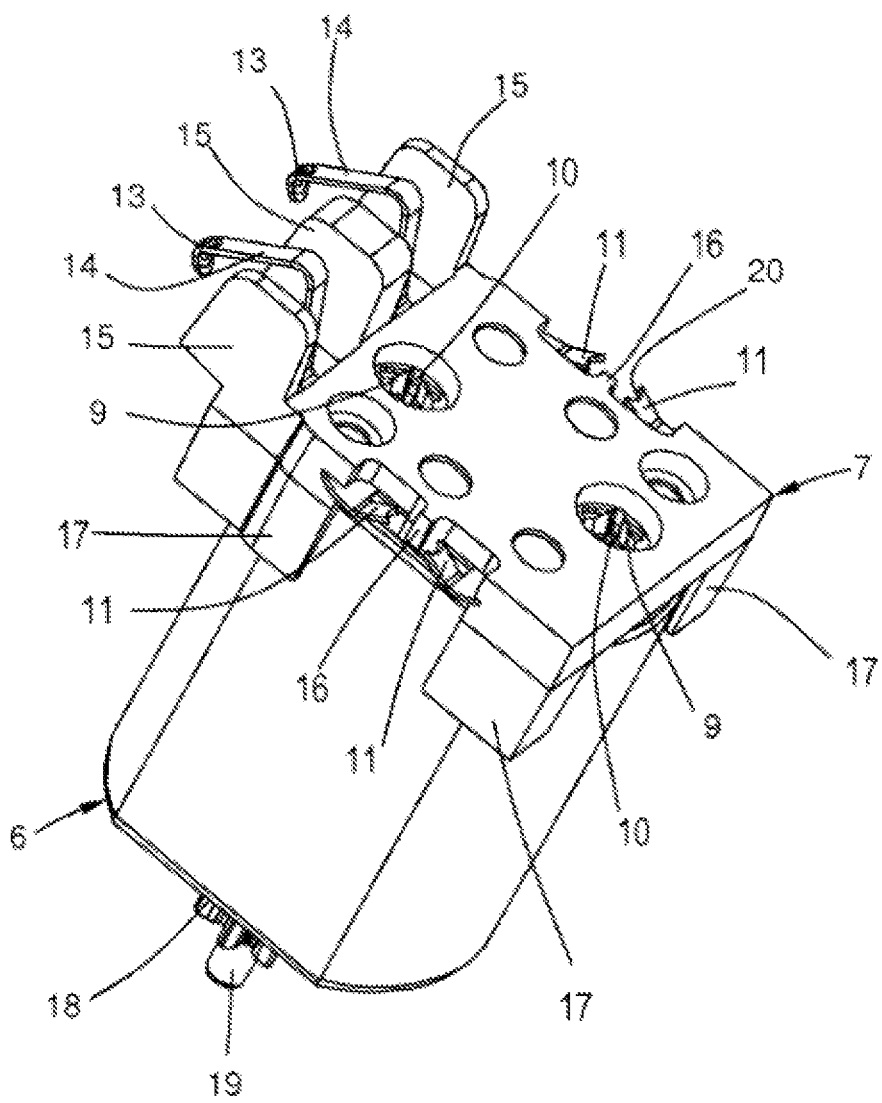
FIG. 8 shows an enlarged view of FIG. 6.

FIGS. 6 and 8 show such an assembly consisting of the miniature electric motor 6 and the terminal cover 7. The lugs 10 of the miniature electric motor 6 are already interlocked with the motor contact areas 9 of the terminal cover 7 and thereby electrically and mechanically connected. The figures also show the spacer 16, the wall 17, the guard 15, and the contact wipers 14.

Figure 7:
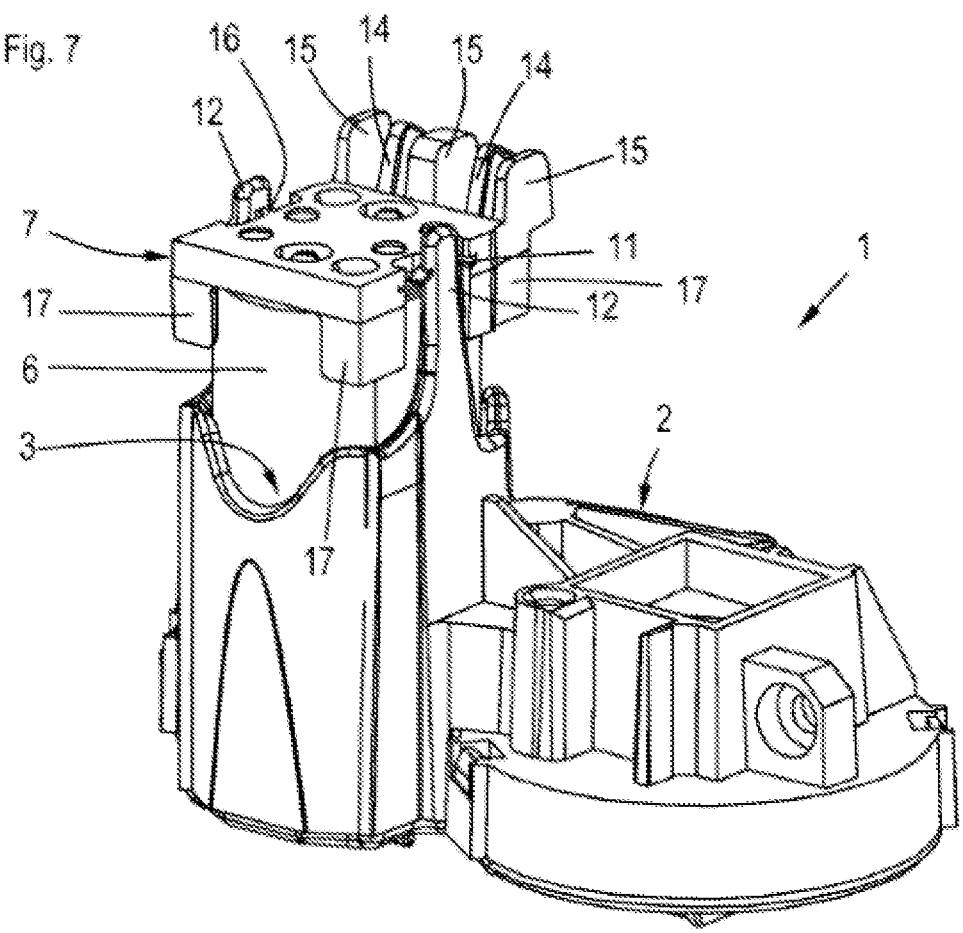
FIG. 7 shows the module from FIG. 6 installed in the housing.

FIG. 7 shows the assembly from FIGS. 6 and 8 mechanically connected to the housing 2 via the molded-on housing elements 12. The length of the molded-on housing elements 12 is selected such that they will extend beyond the terminal cover even if a miniature electric motor with a housing length at the upper tolerance limit is used. In this way, it is always possible to achieve a secure mechanical connection. The molded-on housing elements 12 take the space partly defined by the plates of the holding section 11 and by the associated spacer 16 at a right angle from these. The miniature electric motor 6 is also radially centered and held by the wall 17 of the terminal cover 7. The figure further shows the contact wipers 14 and the guard 15.

FIG. 8 is an enlarged view of FIG. 6. It additionally shows a concave recess 20 at the plates of the holding section 11 that provide improved radial hold of the molded-on housing elements that have a matching convex shape. The spacers 16 are provided to facilitate an easy fit of these matching shapes. They widen the molded-on housing elements that are slightly inclined to one another. The miniature electric motor comprises a motor shaft 19 and a pinion 18 mounted onto the same. The pinion 18 engages with a step-down gear unit.

Figure 9:
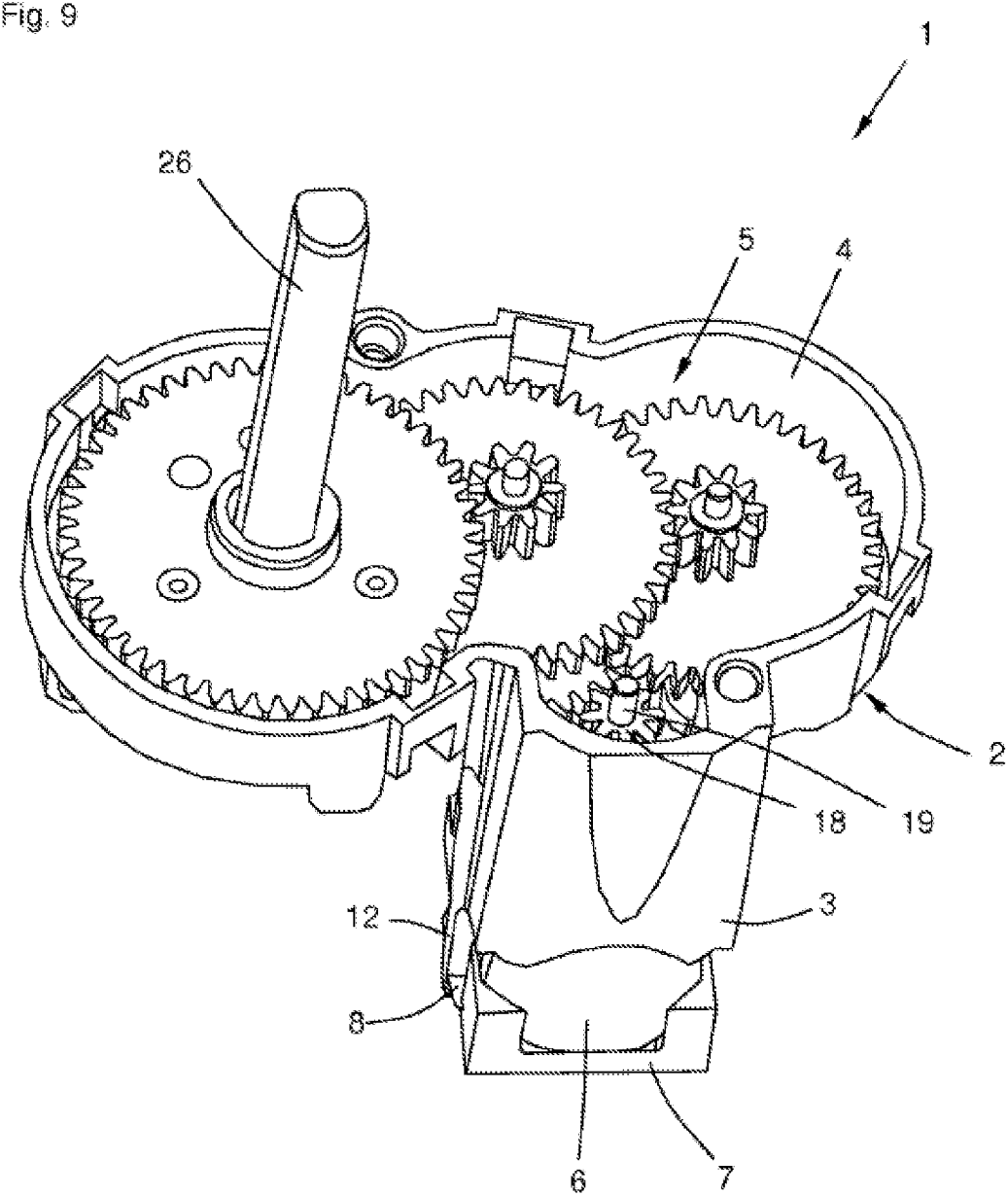
FIG. 9 shows a step-down gear unit of an actuator unit.

FIG. 9 shows the gear seat 4 of the housing 2 of the actuator unit 1 with the step-down gear unit 5 in it, in this figure a multiple-step spur gear unit. The figure also shows the miniature electric motor 6, the terminal cover 7, the conductor stamping 8, the molded-on housing elements 12, the motor shaft 19 and the pinion 18 that engages with the step-down gear unit. The output stage of the gear unit is a spindle gear with a threaded spindle 26 that is locked from rotation with a gear wheel.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMBERS

1 Actuator unit
2 Housing
3 Motor receptacle
4 Gear unit receptacle
5 Step-down gear unit
6 Miniature electric motor
7 Terminal cover
8 Conductor stamping
9 Motor contact area
10 Connection lug
11 Holding section
12 Molded-on housing element
13 Contact
14 Contact wiper
15 Guard
16 Spacer
17 Wall
18 Pinion 19 Motor shaft
20 Recess
21 Area
22 Offset
23 Space
24 Shaving rib
25 Housing wall
26 Gear spindle

What is claimed is:

1. An actuator unit for receiving an electric motor having lugs, the actuating unit comprising:
a housing having a plurality of motor receptacles for a step-down gear unit and for the electric motor, wherein one of the motor receptacles is connected with a terminal cover, wherein the terminal cover consists of a conductor stamping that is extrusion-coated with a plastic material and has motor contact areas that interlock with the lugs of the electric motor, and wherein the conductor stamping includes holding sections that interlock with molded-on housing elements of the housing, the molded-on housing elements extending after one of the motor receptacles for the electric motor in the form of narrow tongues and, when installed, extending beyond the terminal cover, even at the upper tolerance limit for the housing length of the electric motor, so that the terminal cover holds the electric motor axially gap-free in the one of the receptacles across a wide range of tolerances.

2. The actuator unit according to claim 1, wherein the assembly direction of the conductor stamping relative to the lugs is parallel to the assembly direction of the conductor stamping relative to the molded-on housing elements.

3. The actuator unit according to claim 1, wherein the electric motor is firmly held, at least radially, by means of shaving ribs in the receptacle of the housing.

4. The actuator unit according to claim 1, wherein the conductor stamping has contacts for connecting to an electronic circuit and the conductor stamping and contacts are made in one piece.

5. The actuator unit according to claim 4, wherein the contacts are resilient contact wipers.

6. The actuator unit according to claim 5, wherein the plastic material with which the conductor stamping is extrusion-coated includes two guards arranged on both sides of the contact wipers.

7. The actuator unit according to claim 1, wherein the terminal cover comprises spacers in the form of protrusions near the holding sections.

8. An actuator unit for receiving an electric motor having lugs, the actuating unit comprising:
a housing having a plurality of motor receptacles for a step-down gear unit and for the electric motor, wherein one of the motor receptacles is connected with a terminal cover, wherein the terminal cover consists of a conductor stamping that is extrusion-coated with a plastic material and has motor contact areas that interlock with the lugs of the electric motor, and wherein the conductor stamping includes holding sections that interlock with molded-on housing elements of the housing, and wherein the terminal cover further consists of a wall that embraces the end of the electric motor at least at three points.

* * * * *